Nov. 30, 1954     H. J. W. GLIENKE     2,695,487
WINDROW TURNER

Filed Feb. 6, 1953     2 Sheets-Sheet 1

INVENTOR.
HERMAN J. W. GLIENKE,
BY

McMorrow, Berman + Davidson
ATTORNEYS.

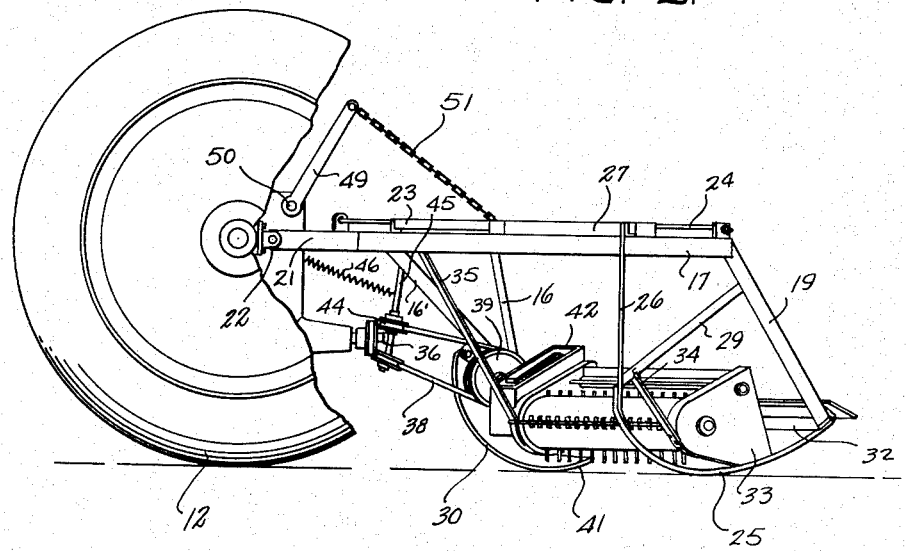
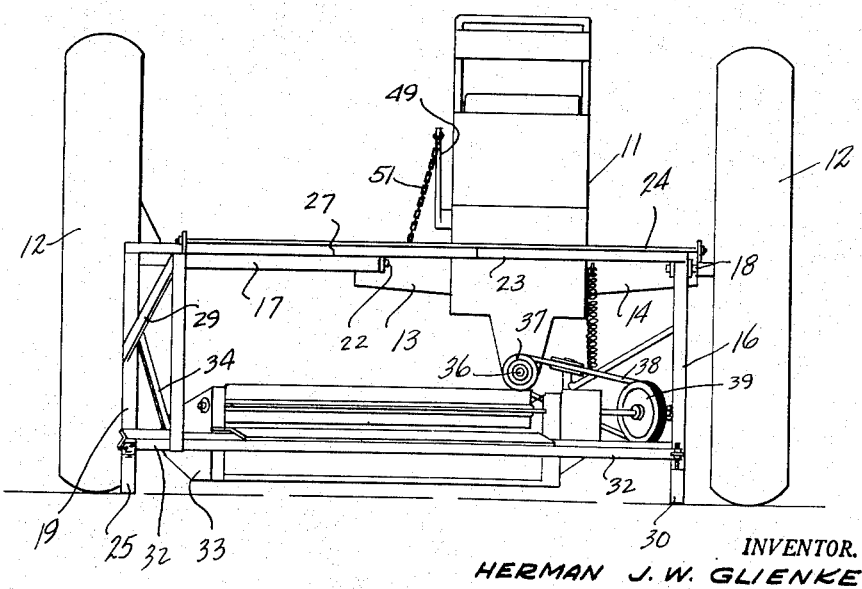

United States Patent Office 2,695,487
Patented Nov. 30, 1954

2,695,487
WINDROW TURNER

Herman J. W. Glienke, Havana, Cuba

Application February 6, 1953, Serial No. 335,484

3 Claims. (Cl. 56—27)

This invention relates to agricultural implements, and more particularly to an improved attachment for connecting a windrow pickup roller to the rear end of a tractor.

The main object of the invention is to provide an improved connecting means for connecting a windrow pickup device to the rear end of a tractor, the connecting means providing an angular relationship of the pickup roller of the pickup device relative to the longitudinal axis of the tractor, whereby the windrowed grain may be lifted or loosened by the machine, moved to a new location, and redeposited on fresh dry stubble, whereby the windrowed grain may be efficiently picked up without undue loss thereof.

A further object of the invention is to provide an improved connecting means for diagonally connecting a pickup device to the rear portion of a tractor, the improved connecting means being simple in construction, being inexpensive to manufacture, being relatively light in weight, and being arranged to locate the pickup roller in a diagonal direction relative to the tractor, whereby the pickup device is effective to lift, ffuff, and redeposit the windrowed grain, even if the grain has become tight, damp and pressed down onto the ground by rain or other elements, the redepositing of the grain being accomplished efficiently and swiftly with very little loss thereof, thus permitting the grain to once more dry out and become ready for combining.

Further objects and advantages of the invention will become apparent from the following description and claims, and from the accompanying drawings, wherein:

Figure 2 is a side elevational view with parts broken away of the connecting device and pickup roller of Figure 1, showing the pivotal connection of the side beams of the connecting device to the rear portion of the tractor.

Figure 3 is a rear elevational view of the device shown in Figures 1 and 2.

Figure 1:
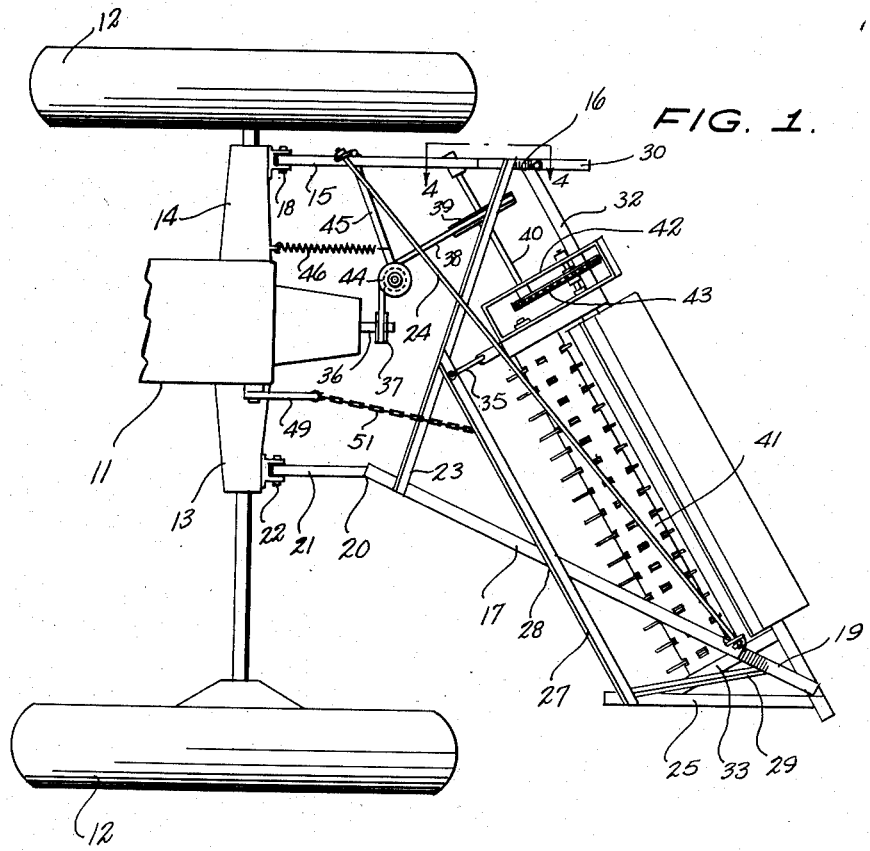
Figure 1 is a top plan view of a fragmentary rear portion of a tractor having an improved windrow pickup device according to the present invention connected to the tractor, the device including the windrow pickup roller.

Referring to the drawings, 11 generally designates the frame of a tractor of conventional construction, said tractor having the rear wheels 12, 12 whose axles are received in respective axle housings 13 and 14. Designated at 15 is a relatively short rearwardly extending bar member which is bent downwardly at 16. The longitudinal beam member 15 is pivotally connected to the end portion of the axle housing 14 at 18 for rotation around a transverse horizontal axis, as shown in Figure 1. Designated at 17 is a second rearwardly extending beam member which is substantially longer than the beam member 15, and which is downwardly bent at 19 at its rear end, as shown. As shown in Figure 1 the beam member 17 is angularly bent outwardly at 20, whereby the rear portion of the beam member 17 is inclined rearwardly and outwardly relative to the relatively short forward end portion 21 of said beam member. The end portion 21 is pivotally connected to the end portion of the axle housing 13, at 22, for rotation around the same transverse horizontal axis as the connection 18. The rearwardly extending relatively short beam member 15 and the relatively long beam member 17 are connected by the cross bar 23, and are further connected by the tie bar 24 which crosses the bar 23 at a substantial angle thereto, as shown in Figure 1, and which cooperates with the cross bar 23 to rigidly connect the beam members 15 and 17.

Designated at 25 is a runner of arcuate shape, as shown in Figures 2 and 3, said runner extending longitudinally and having one end thereof connected to the lower end of the downwardly and rearwardly inclined beam portion 19. The forward end of the longitudinally extending runner 25 is connected by a rod 26 to the outer end portion of a diagonal bar member 27 which is connected at one end to the intermediate portion of the cross beam 23 and which is connected at its intermediate portion to the laterally inclined beam portion 17, as shown at 28. The lower end of the rod 26 is rigidly braced relative to the downwardly and rearwardly extending beam portion 19 by a diagonal bar 29 which connects the lower end of the rod 26 to the upper portion of the beam element 19.

Designated at 30 is a second longitudinally extending runner of arcuate shape which is connected at one end to a plate member 31 welded or otherwise rigidly secured to the intermediate portion of a downwardly and rearwardly inclined beam element 16' rigidly connected at its lower end to the lower end of beam portion 16 at the end of the relatively short beam 15. The rear portion of the runner 30 has rigidly secured thereto the upstanding threaded post element 31' which is adjustably secured to the end of a cross beam 32 connected rigidly to the lower end of the beam element 16. As shown in Figure 1, the beam 15 extends in a longitudinal vertical plane and the runner 30 is supported below the rear portion of the beam element 16 in said longitudinal vertical plane.

Figure 4:
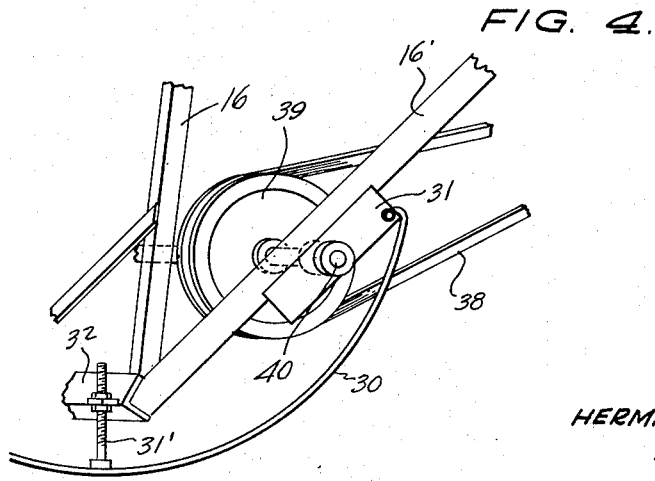
Figure 4 is an enlarged fragmentary detail view taken on the line 4—4 of Figure 1.

As shown in Figure 1, the cross bar 32 extends diagonally and has one end thereof adjustably connected to the runner 30 while its other end is fixedly connected to the rear portion of the runner 25. The beam 15 is rigidified by the diagonally extending brace member 16' which connects the lower end of the beam element 16 to the intermediate portion of the forward section of the beam 15, and as above mentioned, the plate member 31 is welded to the intermediate portion of the brace bar 16'. Designated generally at 33 is a conventional windrow pickup unit which is supported in a diagonal position on the cross bar 32 and is connected by suitable strut rods 34 and 35 respectively to brace bar 29 and diagonal brace bar 27. The tractor is provided with a power takeoff shaft 36 having a pulley 37 which is connected by a belt 38 to a pulley 39 mounted on a shaft 40 journaled in the framework of the device in a position parallel to the windrow pickup roller, shown at 41. As shown in Figure 4, one end of the shaft 40 is journaled in the plate 31. The other end of the shaft 40 is journaled in the side wall of a rectangular bracket 42 secured to one end of the pickup unit 33. Shaft 40 is coupled by a sprocket chain 43 to the pickup unit for rotating the roller 41 in response to rotation of the power takeoff shaft 36, the chain 43 engaging respective sprockets of different sizes, whereby a desired speed ratio is provided between the power takeoff shaft 36 and the pickup roller 41. The belt 38 is maintained taut by conventional belt tightening means, such as idler pulleys 44 mounted on an arm 45 which is pivoted in any suitable manner to the beam 15 and which is biased forwardly by a coiled spring, such as the spring 46, to urge the pulleys 44 against the belt 38 and to maintain said belt in a tight condition.

Designated at 49 is a manually controlled lever which is pivoted at 50 to the tractor frame and which is connected by a chain 51 to the cross bar 27, whereby the pickup attachment may be at times elevated to an inoperative position.

Normally, the device is supported on the runners 30 and 25, the runner 25 being rearwardly offset a substantial distance relative to the runner 30, whereby the pickup roller 41 of the pickup unit is supported in a diagonal position, and whereby the windrowed grain engaged by the pickup roller is lifted and loosened, and redeposited upon the ground or stubble to dry. The diagonal arrangement of the pickup unit has been found to provide a very efficient loosening action on windrowed grain which has become tight, damp, and depressed to the ground by rain or other elements, whereby the grain may be picked up with a minimum loss and moved to a new location.

While a specific embodiment of an improved means for connecting a windrow pickup device to a tractor has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A windrow pickup device comprising a frame adapted to be connected to the rear portion of a tractor and to extend rearwardly therefrom, said frame comprising a relatively short first side member, a relatively long second side member extending rearwardly beyond the end of said short side member, respective longitudinal ground-engaging runners secured to the opposite sides of said frame, transversely extending means rigidly connecting said side members, a horizontal windrow pickup roller journaled diagonally in said frame, a drive shaft journaled in said frame, and means coupling said drive shaft to said pickup roller.

2. In combination with a tractor, a relatively short, rearwardly extending longitudinal beam pivotally connected to the rear potrion of the tractor at one side thereof, a relatively long, outwardly angled, rearwardly extending beam pivotally connected to the rear portion of the tractor at the other side thereof extending rearwardly beyond the end of said short side member, means rigidly connecting said beams, a first ground-engaging longitudinal runner secured to said short beam, a second ground-engaging longitudinal runner secured to said long beam, parallel to but rearwardly offset from the first runner, a windrow pickup roller, means connected to said beams and rotatably supporting said roller in a horizontal diagonal position rearwardly of the tractor, a power takeoff shaft on the tractor, and means connecting said power takeoff shaft to said windrow pickup roller.

3. In combination with a tractor, a relatively short rearwardly extending longitudinal beam pivotally connected to the rear portion of the tractor at one side thereof, a relatively long, outwardly angled, rearwardly extending beam pivotally connected to the rear portion of the tractor at the other side thereof extending rearwardly beyond the end of said short side member, means rigidly connecting said beams, a first ground-engaging longitudinal runner secured to said short beam, a second ground-engaging longitudinal runner secured to said long beam parallel to but rearwardly offset from the first runner, a windrow pickup roller, means connected to said beams and rotatably supporting said roller in a horizontal diagonal position rearwardly of the tractor, a power takeoff shaft on the tractor, respective bracket means connected to said short beam and said last-named means, a drive shaft journaled in said bracket means parallel to said roller, means connecting said drive shaft to said roller, and means coupling said drive shaft to said power takeoff shaft.

References Cited in the file of this patent

UNITED STATES PATENTS

| Number | Name | Date |
|---|---|---|
| 2,296,065 | Slamp | Sept. 15, 1942 |
| 2,502,599 | Smart | Apr. 4, 1950 |
| 2,529,422 | Sampson | Nov. 7, 1950 |
| 2,559,862 | Ferguson | July 10, 1951 |